(12) United States Patent
Bei et al.

(10) Patent No.: US 11,971,793 B2
(45) Date of Patent: Apr. 30, 2024

(54) MACHINE LEARNING MODEL-BASED DYNAMIC PREDICTION OF ESTIMATED QUERY EXECUTION TIME TAKING INTO ACCOUNT OTHER, CONCURRENTLY EXECUTING QUERIES

(71) Applicant: ENTIT Software LLC, Sanford, NC (US)

(72) Inventors: Yuanzhe Bei, Cambridge, MA (US); Zhihao Zheng, Cambridge, MA (US)

(73) Assignee: Micro Focus LLC, Santa Clara, CA (US)

( * ) Notice: Subject to any disclaimer, the term of this patent is extended or adjusted under 35 U.S.C. 154(b) by 1130 days.

(21) Appl. No.: 16/292,990

(22) Filed: Mar. 5, 2019

(65) Prior Publication Data

US 2020/0285642 A1    Sep. 10, 2020

(51) Int. Cl.
  *G06F 16/00*     (2019.01)
  *G06F 7/00*      (2006.01)
  (Continued)

(52) U.S. Cl.
  CPC .... *G06F 11/3006* (2013.01); *G06F 16/24542* (2019.01); *G06F 16/9027* (2019.01)

(58) Field of Classification Search
  CPC ........... G06F 16/24542; G06F 16/9027; G06F 11/3006
  (Continued)

(56) References Cited

U.S. PATENT DOCUMENTS 9,311,354 B2   4/2016  Sun et al.
9,477,707 B2  10/2016  Chi et al.
(Continued)

FOREIGN PATENT DOCUMENTS

CN   105550274   5/2016

OTHER PUBLICATIONS

Golov, N. et al., 2015. Big Data Normalization for Massively Parallel Processing Databases. In Advances in Conceptual Modeling, Manfred A. Jeusfeld and Kamalakar Karlapalem (Eds.). Springer International Publishing, Cham, 154-163.
(Continued)

*Primary Examiner* — Raquel Perez-Arroyo
(74) *Attorney, Agent, or Firm* — Sheridan Ross P.C.

(57) ABSTRACT

Current physical resources utilization of a computing system as a whole is monitored. The number of queries concurrently being executed against a database by a database management system (DBMS) running on a computing system is monitored. A query plan for a received query to be executed against the database is generated. The query plan includes operators; the generation of the query plan includes generation of query-based statistics for the received query on a per-operator basis without consideration of the queries concurrently being executed. An estimated execution time of the received query is dynamically predicted using a machine-learning model based on the query-based statistics generated for the received query on the per-operator basis, the current physical resources utilization of the computing system, and the number of queries concurrently being executed. The received query is executed against the database based on the dynamically predicted estimated execution time for the received query.

20 Claims, 8 Drawing Sheets

(51) Int. Cl.
*G06F 11/30* (2006.01)
*G06F 16/2453* (2019.01)
*G06F 16/901* (2019.01)

(58) Field of Classification Search
USPC .......................................................... 707/718
See application file for complete search history.

(56) References Cited

U.S. PATENT DOCUMENTS

| | | | | |
|---|---|---|---|---|
| 2010/0114865 | A1* | 5/2010 | Gupta | G06F 16/217 |
| | | | | 707/E17.017 |
| 2016/0203404 | A1* | 7/2016 | Cherkasova | G06N 5/04 |
| | | | | 706/12 |
| 2017/0024446 | A1* | 1/2017 | O'Kane | G06F 16/2282 |
| 2018/0314735 | A1 | 11/2018 | Liu et al. | |
| 2018/0336247 | A1* | 11/2018 | Ignatyev | G06F 16/24542 |
| 2018/0349364 | A1* | 12/2018 | Arnold | G06F 16/2455 |
| 2019/0384845 | A1* | 12/2019 | Saxena | G06F 16/24545 |
| 2020/0104397 | A1* | 4/2020 | Fan | G06F 9/52 |
| 2020/0264928 | A1* | 8/2020 | Kalmuk | G06F 9/5011 |

OTHER PUBLICATIONS

Lamb, A. et al., 2012. The Vertica Analytic Database: C-store 7 Years Later. Proc. VLDB Endow. 5, 12 (Aug. 2012), 1790-1801. https://doi.org/10.14778/2367502.2367518.

Liaw, A. et al. 2002. Classification and regression by randomForest. R news 2, 3 (2002), 18-22.

Milicevic, M. et al., Application of Machine Learning Algorithms for the Query Performance Prediction, Advances in Electrical and Computer Engineering, vol. 15, No. 3, 2015, 33-44.

Dageville, B. et al. 2004. Automatic SQL Tuning in Oracle 10G. In Proceedings of the Thirtieth International Conference on Very Large Data Bases—vol. 30 (VLDB '04). VLDB Endowment, 1098-1109. http://dl.acm.org/citation.cfm?id=1316689.1316784.

Macdonald, C. et al. 2012. Learning to Predict Response Times for Online Query Scheduling. In Proceedings of the 35th International ACM SIGIR Conference on Research and Development in Information Retrieval (SIGIR '12). ACM, New York, NY, USA, 621-630.

Rahm, E. et al., 1995. Dynamic Multi-Resource Load Balancing in Parallel Database Systems. In Proceedings of the 21th International Conference on Very Large Data Bases (VLDB '95). Morgan Kaufmann Publishers Inc., San Francisco, CA, USA, 395-406.

Kuno, H. et al. 2010. Managing Dynamic Mixed Workloads for Operational Business Intelligence. In Databases in Networked Information Systems, Shinji Kikuchi, Shelly Sachdeva, and Subhash Bhalla (Eds.). Springer Berlin Heidelberg, Berlin, Heidelberg, 11-26.

Duggan, J. et al. 2011. Performance Prediction for Concurrent Database Workloads. In Proceedings of the 2011 ACM SIGMOD International Conference on Management of Data (SIGMOD '11). ACM, New York, NY, USA.

Breiman, L. et al., 1984. Classification and regression trees. Wadsworth Brooks/Cole Advanced Books Software.

Ehner, W. et al., 2010. Database as a service (DBaaS). In 2010 IEEE 26th International Conference on Data Engineering (ICDE 2010). 1216-1217. https://doi.org/10.1109/ICDE.

Breiman, L., 1996. Bagging predictors. Machine Learning 24, 2 (1996), 123-140.

Stonebraker, M. et al., 2010. MapReduce and Parallel DBMSs: Friends or Foes? ACM 53, 1 (Jan. 2010), 64-71. https://doi.org/10.1145/1629175.1629197.

Stonebraker, M. et al., 2005. C-store: A Column-oriented DBMS. In Proceedings of the 31st International Conference on Very Large Data Bases (VLDB '05). VLDB Endowment, 553-564. http://dl.acm.org/citation.cfm?id=1083592.1083658.

Rogers, J. et al., Performance Prediction for Concurrent Database Workloads, SIGMOD'11, Jun. 12-16, 2011, Athens, Greece.

Agarwal, S. et al., 2013. BlinkDB: Queries with Bounded Errors and Bounded Response Times on Very Large Data. In Proceedings of the 8th ACM European Conference on Computer Systems (EuroSys'13). ACM, New York, NY, USA, 29-42.

Krompass, S. et al., 2008. Towards Generating ETL Processes for Incremental Loading. In Proceedings of the 2008 International Symposium on Database Engineering & Applications (IDEAS '08). ACM, New York, NY, USA, 101-110. https://doi.org/10.1145/1451940.1451956.

Chaudhuri, S. et al., 2000. Rethinking Database System Architecture: Towards a Self-Tuning RISC-Style Database System. In Proceedings of the 26th International Conference on Very Large Data Bases (VLDB '00). Morgan Kaufmann Publishers Inc., San Francisco, CA, USA, 1-10. http://dl.acm.org/citation.cfm?id=645926.671696.

Jörg, T. et al. 2008. Towards Generating ETL Processes for Incremental Loading. In Proceedings of the 2008 International Symposium on Database Engineering & Applications (IDEAS '08). ACM, New York, NY, USA, 101-110. https://doi.org/10.1145/1451940.1451956.

Ho, T.K., 1995. Random Decision Forests. In Proceedings of the 3rd International Conference on Document Analysis and Recognition. 278-282.

Ho, T.K., 1998. The Random Subspace Method for Constructing Decision Forests. IEEE Transactions on Pattern Analysis and Machine Intelligence 20, 8 (1998), 832-844.

Wu, W. et al., 2013. "Towards Predicting Query Execution Time for Concurrent and Dynamic Database Workloads", Proc. VLDB Endow. 6, 10 (Aug. 2013), 925-936.

Transaction Processing Performance Council. 2008. TPC-H benchmark specification. Published at http://www.top.org/hspec.html 21 (2008), 592-603.

Pelkonen, T. et al. 2015. Gorilla: A Fast, Scalable, In-memory Time Series Database. Proc. VLDB Endow. 8, 12 (Aug. 2015), 1816-1827. https://doi.org/10.14778/2824032.2824078.

Wu, W. et al. 2013. Predicting query execution time: Are optimizer cost models really unusable ?. In 2013 IEEE 29th International Conference on Data Engineering (ICDE). 1081-1092.

* cited by examiner

MACHINE LEARNING MODEL-BASED DYNAMIC PREDICTION OF ESTIMATED QUERY EXECUTION TIME TAKING INTO ACCOUNT OTHER, CONCURRENTLY EXECUTING QUERIES

BACKGROUND

Data is the lifeblood of many entities like business and governmental organizations, as well as individual users. Large-scale storage of data in an organized manner is commonly achieved using databases. Databases are collections of information that are organized for easy access, management, and updating. Data may be stored in tables over rows (i.e., records or tuples) and columns (i.e., fields or attributes). In a relational database, the tables have logical connections, or relationships, with one another, via keys, which facilitates searching, organization, and reporting of the data stored within the tables.

DETAILED DESCRIPTION

As noted in the background, databases store data in tables over rows and columns, where the tables can be interrelated with one another in relational databases. Maintenance of large-scale databases storing enormous amounts of data over large numbers of tables can be complicated, to ensure high availability and stable latency. Such database maintenance is made more difficult by the varying frequency and complexity of received queries that are processed against the tables of a database.

A query is a request for data or information stored in a database in one or more tables. A query may be formulated in a particular query language, such as the structured query language (SQL). To execute a query, a database management system (DBMS) can generate a query plan that decomposes the query into a set of operators, each of which perform a single operation on one or more rows of one or more tables. The operators may be interrelated with one another within a tree, such that execution of the operators fulfills the query.

With increasing data volume and the increasing demand for low query latency, database designers have turned to massive parallel processing (MPP) architectures by which to implement DBMSs. An MPP database is one that is optimized to be processed in parallel, so that many operations can be performed at the same time. MPP databases can leverage multiple-core processors, and multiple-processor computing systems, as well as parallel computing architectures that have increased in viability as a result of ongoing development of graphical processing units (GPUs) originally designed for displaying graphical information on displays.

A DBMS can include a query optimizer, which optimizes a received query into a query plan made up of a set of operators. Query optimization generally includes determining the score of a query, which is the predicted estimated length of time to execute the query. Query score takes into account the complexity of the selected query plan for a query, as well as the resources—including storage device, network, memory, and processing resources—that query execution will utilize.

A DBMS may execute a query based on its estimated score. Queries that are expected to take a long amount of time to execute (i.e., greater than a threshold) may use different pools of resources (e.g., storage device, network, memory, and processing resources) than queries that are expected to take a short amount of time to execute (i.e., less than the threshold). Such resource pooling ensures that query latencies of such latter, short-run queries do not unduly increase in length of time due to the former, long-run queries monopolizing the available physical resources.

DBMS query optimizers generally can accurately predict query score for a query in isolation, even in the context of an MPP architecture in which the operators of a query plan for the query can be executed in parallel. However, such query optimizers do not take into account the fact that there are concurrent queries. That is, the query optimizers may not take into account that the DBMS may be concurrently executing multiple queries concurrently when predicting the query score for a newly received query. This means the estimated query score for a query may be wildly inaccurate, depending on the existence of other, concurrent queries currently being evaluated by the DBMS.

Inaccurate estimation of query score can have deleterious effects on DBMS performance. For example, where queries are assigned to specific resource pools for execution, a query incorrectly regarded as a short-run query may begin to monopolize the resource pool dedicated for short-run queries, to the performance detriment of actual short-run queries. While query execution can be monitored so that a query assigned to the short-run resource pool can be transferred to the long-run resource pool if query execution proves to be taking too long, there are scores associated with such query transfer, and resource utilization is wasted in transferring queries between resource pools.

Techniques described herein ameliorate these shortcomings, by dynamically predicting estimated query execution time of a received query while taking into account other, concurrently executing queries. The prediction of the estimated query execution time of a query is dynamic in that no prior static knowledge of the query or the other, concurrently executing queries has to be known a priori. The techniques described herein use a machine-learning model to dynamically predicted query execution time, and can leverage query-based statistics that a DBMS query optimizer may already generate when calculating query score for a received query in isolation. The machine-learning model can use such query-based statistics as input features, and take into account other, concurrently executing queries by also employing current physical resource utilization and the actual number of other, concurrently executing queries as additional input features.

Figure 1:
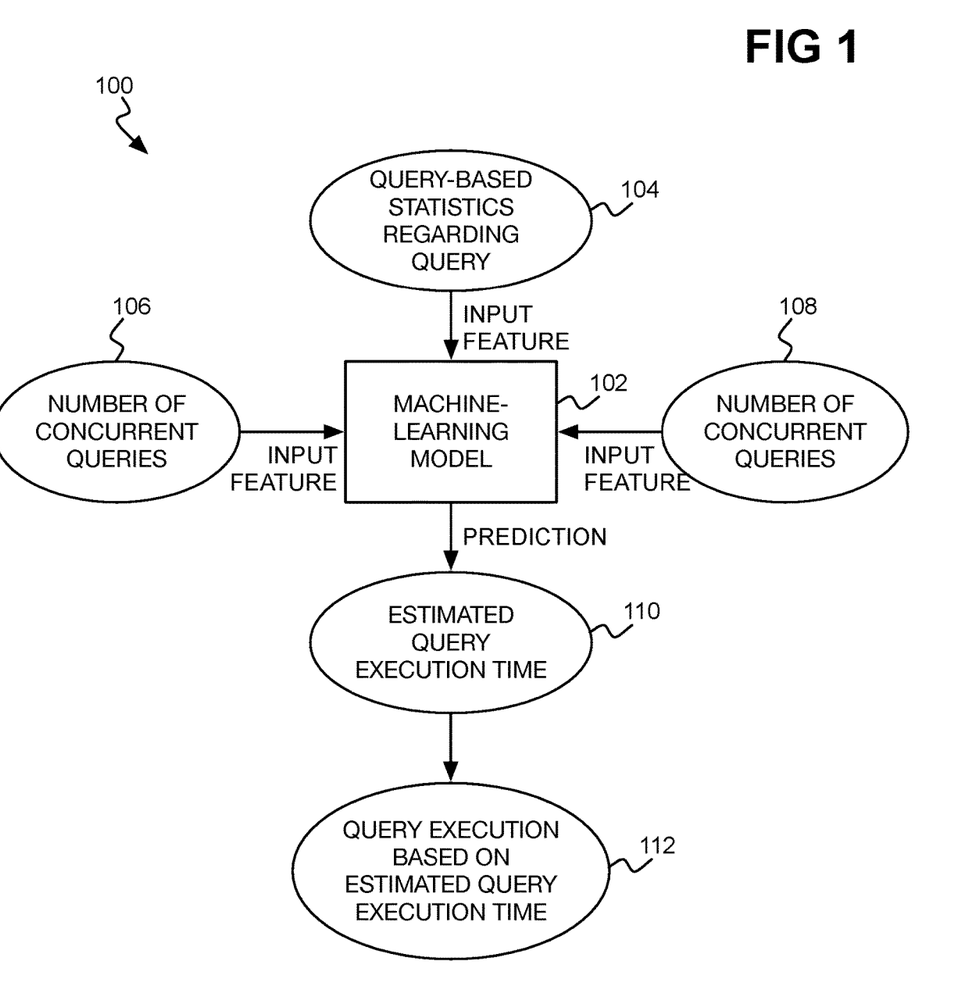
FIG. 1 is a diagram of an example architecture for machine learning model-based dynamic prediction of estimated query execution time that takes into account other, concurrently executing queries.

FIG. 1 shows an example architecture 100 for machine learning model-based dynamic prediction of estimated query execution time that takes into account other, concurrently executing queries. The architecture 100 includes a machine-learning model 102. The machine-learning model 102 may be a random forest regression model. A regression tree is generally a tree-like predictive model that uses input features to navigate from a root node through various branches to a leaf node where the desired target value (e.g., estimated query execution time) is represented. The leaf nodes may themselves by linear regression models having parameter vectors that are applied to an input feature vector to generate the desired target value. The random forest regression model is more specifically an ensemble learning approach that can train multiple regression trees and produce an inference by averaging the predictions made by individual regression trees, while avoiding creating trees that are highly correlated with one another.

In the example architecture 100, the machine-learning model 102 has three types of input features: query-based statistics regarding a received query 104, current physical resources utilization 106, and the number of other, concurrently executing queries 108. The query-based statistics 104 may be generated using the existing query optimizer of a DBMS, and in this respect the example architecture 100 leverages such an existing DBMS query optimizer. However, the query-based statistics 104 are generated with respect to the received query in isolation, without considering the other queries that the DBMS is concurrently executing. The architecture 100, in other words, novelly extends the usage of such query-based statistics 104 that just consider the received query in isolation, in predicting an estimated query execution time 110 for the query that also factors in the other, concurrently executing queries.

The query-based statistics for a received query 104 can pertain to the query as a whole as well as to each individual operator of the query plan for the query on a per-operator basis. As to the former, the query-based statistics for the received query 104 can include the estimated query execution score that the DBMS query optimizer predicted for the query in isolation from any other query that is concurrently executing. As to the latter, for each operator of the query plan, the query-based statistics 104 can include the individual processor, memory, and network utilizations to execute the operator, as well as the total resource usage to execute the operator, as described in more detail later in the detailed description. As also described in more detail later in the detailed description, the query-based statistics 104 for each operator can include the number of input table rows and the (estimated) number of output table rows of the operator.

Ultimately, all the query-based statistics that the DBMS query optimizer already generates for a query in isolation may be used as input features to the machine-learning model 102, or a subset thereof may be used. In one implementation, the query-based statistics regarding the received query 104 do not require any additional processing, in other words, because the query-based statistics 104 are information that the query optimizer is already generating when predicting estimated query execution time for the received query in isolation (i.e., not taking into account the other, concurrent queries). Each of the query-based statistics 104 thus is an input feature to the machine-learning model 102, and the statistics 104 as a whole are a first type of such an input feature.

The other two types of input features to the machine-learning model 102 in this respect have been proven to be sufficient additional input features so that the model 102 can accurately predict estimated query execution time 110 that takes into account the other, concurrently executing query. The current physical resources utilization 106 is the current utilization of the physical resources of the computing system, on which the DBMS is running, as a whole. That is, the current physical resources utilization 106 are not on a per-query basis, but rather reflect the current utilization of the physical resources of the DBMS's underlying computing system.

The current utilization is thus reflective of all activity of the computing system, including the DBMS's concurrent execution of other queries, as well as other activity of the computing system, such as processing overhead, and any other tasks that the computing system may be performing apart from those associated with the DBMS. The current physical resources utilization 106 can include a number of different input features. For example, the current physical resource utilization 106 can include an input feature corresponding to the current processor utilization of the computing system as a whole; an input feature corresponding to the current memory utilization of the computing system as a whole; an input feature corresponding to the current storage utilization of the computing system as a whole; and an input feature corresponding to the current network utilization of the computing system as a whole.

The number of concurrent queries 108 is the third type of input feature to the machine-learning model 102. The number of concurrent queries 108 can thus be a simple scalar number that is the count of the queries that are concurrently executing on the DBMS. It has been novelly determined, then, that a machine-learning model 102, such as a random forest regression model, that considers various current physical resources utilization 106 and the number of concurrent queries 108 as input features in addition to the query-based statistics 104 that a DBMS query optimizer already generates is sufficient to accurately predict the estimated execution time of a received query.

Rather than completely reworking or changing how the DBMS query optimizer itself predicts estimated execution time in isolation, rather than not considering the information that the DBMS query optimizer already generates when predicting estimated execution time in isolation, and rather than constructing an entirely new model requiring impractical information collection, the techniques described herein thus elegantly employ two additional types of input features to accurately predicted estimated query execution time in the context of concurrent query execution. The current physical resources utilization 106 of a computing system can be straightforwardly monitored. Likewise, the number of concurrent queries 108 is information that the DBMS has readily available. Insofar as the query-based statistics regarding a received query 104 is information that is already being generated, obtaining these types of input feature provides for rapid construction of the described techniques without an inordinate amount of additional resources and time.

Therefore, the machine-learning model 102 uses the query-based statistics of a received query 104, the current physical resources utilization 106 of the computing system as a whole, and the number of concurrent queries 108, as input features of an input vector, from which the model 102 predicts the estimated query execution time 110 of the received query. The estimated query execution time 110 takes into account the other, concurrently executing queries on the DBMS, insofar as the current physical resource utilization 106 and the number of concurrent queries 108 together reflect such queries and their effect on the DBMS.

The DBMS may then proceed with execution 112 of the received query based on the estimated query execution time 110 predicted by the machine-learning model 102, as described in detail below.

Figure 2:
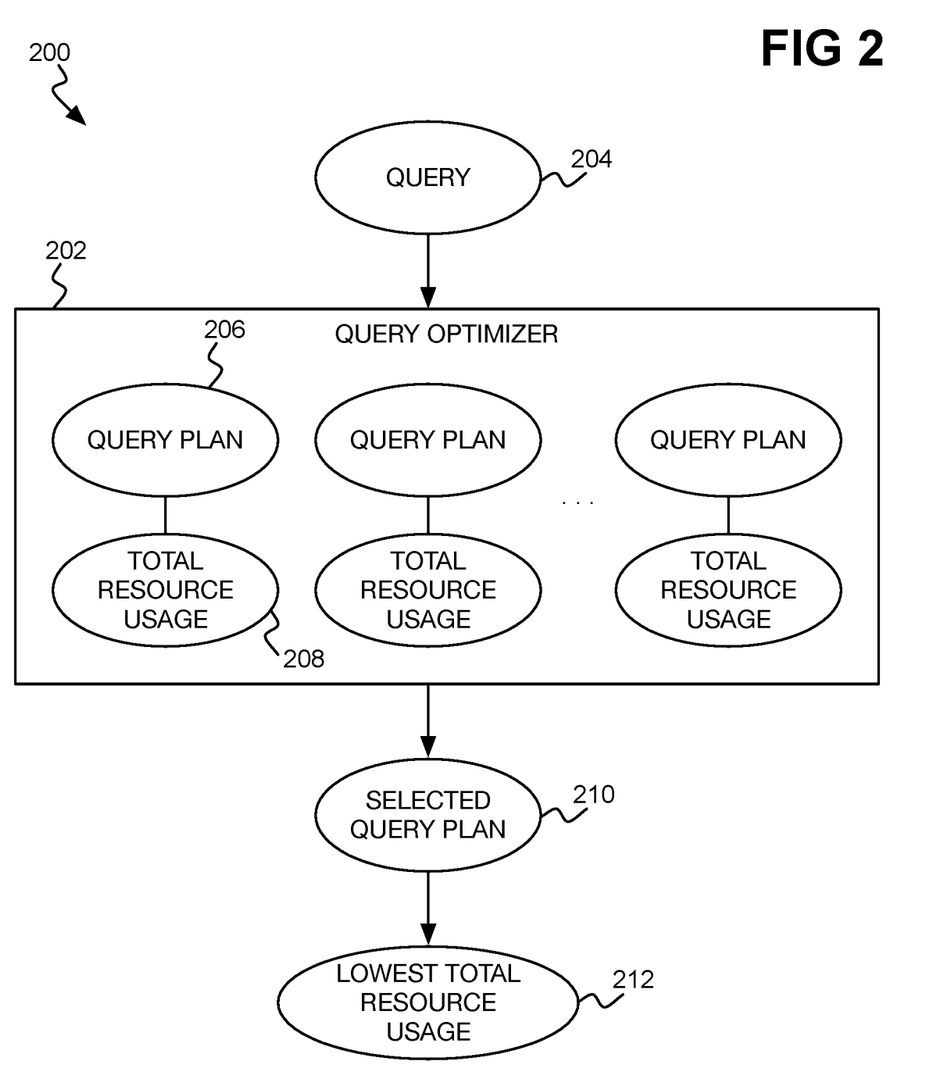
FIG. 2 is a diagram of example query plan selection for a query by a query optimizer.

FIG. 2 shows an example 200 as to how a query optimizer 202 selects a query plan 210 for a received query 204. The query optimizer 202 of a DBMS running on a computing system generates a number of candidate query plans 206 for the received query 204. Each query plan 206 is an ordered set of steps that when executed can fulfill the query 204. Because a query 204 may be fulfilled in different ways—using different sets of steps—there are thus multiple candidate query plans 206.

The query optimizer 206 further calculates the total resource usage 208 of each candidate query plan 206. The total resource usage 208 is the usage, in the amount of resources consumed, that execution of the corresponding query plan 206 would entail. Different candidate query plans 206 have different total resource usages 208. The query optimizer 206 does not take into account other, concurrently executing queries when calculating the total resource usage 208 for each candidate query plan 206, as noted above.

The query optimizer 202 chooses from the candidate query plans 206 the selected query plan 210 that has the lowest total resource usage 212. Because the query optimizer 202 does not take into account any concurrent queries, the selected query plan 210 is the query plan 206 that has the expected lowest total resource usage 212 when executed in isolation. The selected query plan 210 is the query plan for the received query 204—i.e., the query plan that will be executed to fulfill the received query 204.

As such, in at least some implementations, which query plan 206 is selected to fulfill a received query 204 is thus not affected or influenced by any concurrent queries. Rather, the concurrent queries affect (just) how the query plan 206 for the query 204 is executed, based on the predicted estimated execution time of the query 204. That is, in at least some implementations herein, the input features represented by the current physical resources utilization 106 of the system as a whole and the number of concurrent queries 108 do not affect which query plan 206 the query optimizer 202 selects for execution to fulfill the query 204, but just the predicted estimated execution time of the query 204.

Figure 3:
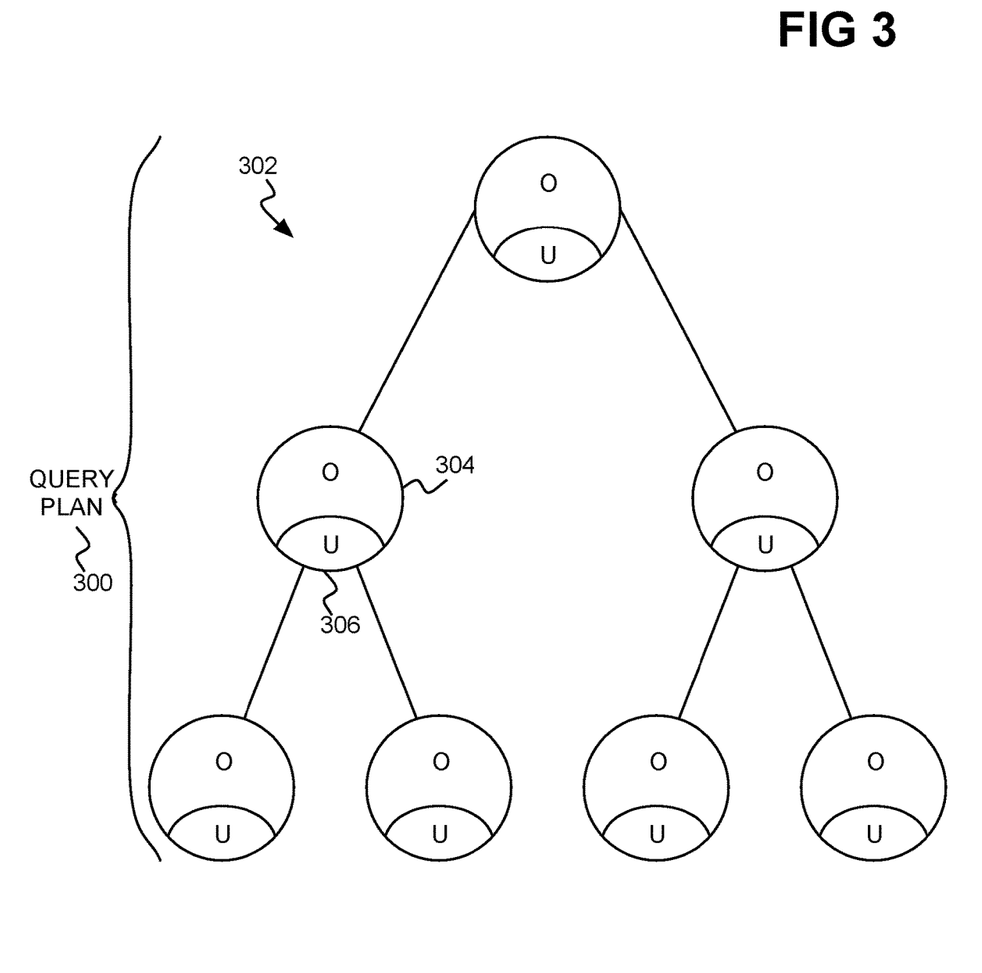
FIG. 3 is a diagram of an example query plan having a number of operators.

FIG. 3 shows an example query plan 300 in detail. The query plan 300 can represent any of the query plans 206, such as the selected query plan 210. The query plan 300 includes an operation tree 302 of operators 304. Generation of the query plan 300 thus entails generation of the operators 304 arranged in the operation tree 302. To execute the query plan 300, the operators 304 are executed in a bottom-up manner. Each operator 304 may have one or more table rows as input, and may output one or more table rows, which are then input into higher-level operators 304. On an MPP DBMS, the operators 304 are executed in parallel to the extent that they can, including via the usage of branch prediction, using multiple pipelines of the DBMS. Such intra-query plan operator execution concurrency may be considered by the query optimizer 202 of FIG. 2 when determining the total resource usage 208 of a query plan 206, and is not to be confused with inter-query execution concurrency (i.e., the concurrent execution of multiple queries).

Each operator 304 of the operation tree 302 of the query plan 300 for a query has operator resource usages 306. The total resource usage 208 of a query plan 206 in FIG. 2, however, is not necessarily the sum of the resource usages 306 of the individual operators 304 of the operation tree 302.

This is because the operators 304 do not have to be executed sequentially, but rather are typically executed in parallel to at least some extent.

Figure 4:
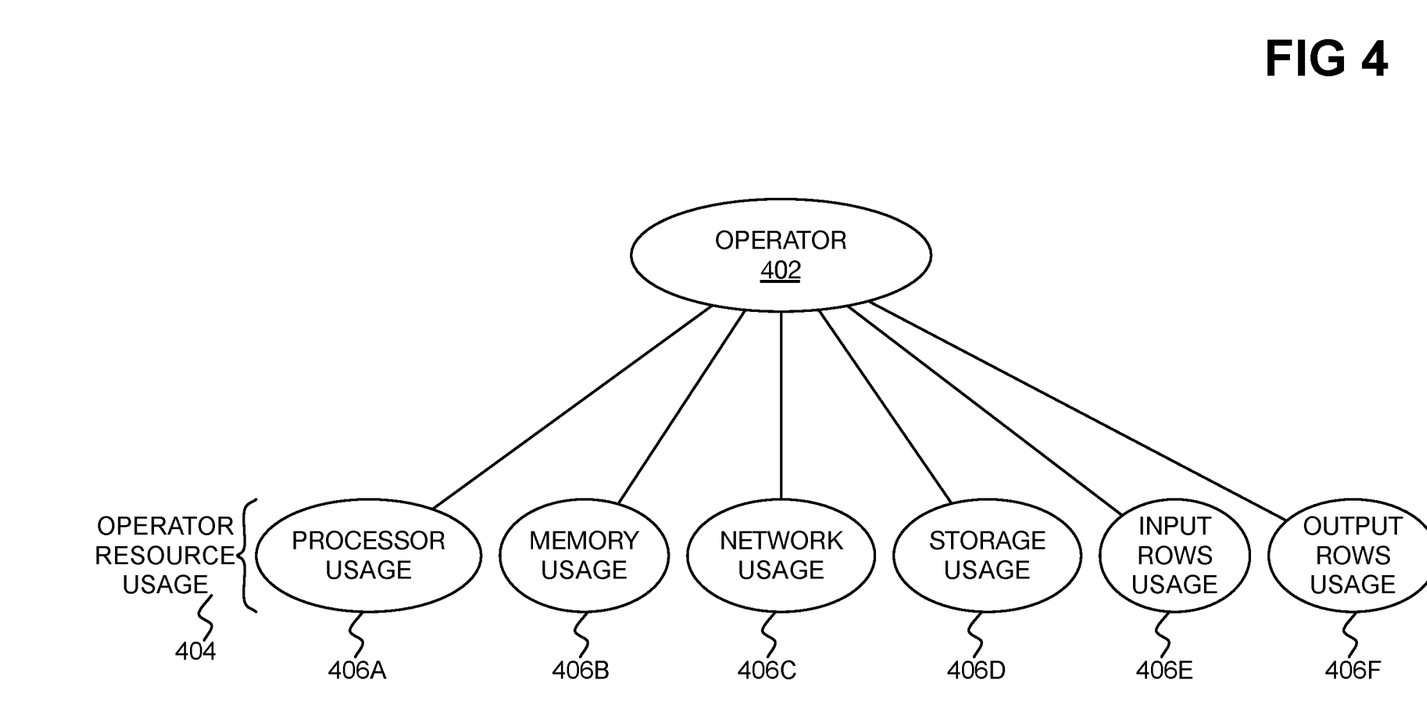
FIG. 4 is a diagram of an example query plan operator and its operator resource usage.

FIG. 4 shows an example operator 402 and example operator resource usages 404 for the operator 402. The resource usages 404 can include processor utilization, or usage, 406A; memory utilization, or usage, 406B; network utilization, or usage, 406C; and storage utilization, or usage, 406D. The resource usages 404 for the operator 402 can also include the number of table rows that have to be input to the operator 402 (i.e., the input data on which the operator 402 is executed), which is referred to as the input rows usage 406E, and the number of table rows 406F that the operator 402 is estimated to output (i.e., the output data of the operator 402), which is referred to as the output rows usage 406F.

The operator resource usages 404 are generated by the query optimizer 202 of FIG. 2 when generating each query plan 206 and calculating the associated total resource usage 208 for each query plan 206. The operator resource usages 404 of all the operators 402 of the selected query plan 210 for the received query 204 are, along with the total resource usages 212 of the query plan 210 itself, the query-based statistics 104 of FIG. 1 regarding the query 204. That is, the processor usage 406A, the memory usage 406B, the network usage 406C, the storage usage 406D, the input rows usage 406E and the 406F of every operator 402 of the selected query plan 210 for the received query 304 are query-based statistics 104 that are input as input features of the input vector input to the machine-learning model 102 in FIG. 1.

Therefore, in the techniques described herein, a large majority of the input features of the input vector in which basis the machine-learning model 102 predicts the estimated query execution time 110 for a query that takes into account other, concurrently executing queries can be the query-based statistics 104 that the query optimizer 202 already generates when selecting a query plan 210 without considering these concurrent queries. As noted above, the query-based statistics 104 can be supplemented with just two other types of input features: current physical resources utilization 106 of the computing system as a whole, and the actual number of concurrent queries 108. It has been novelly determined that supplementing the query-based statistics 104 already generated when selecting a query plan 206 without considering the concurrent queries with these other input features is sufficient to accurately predict the estimated query execution time 110 of this query plan 206 in the context of the concurrent queries.

Figure 5:
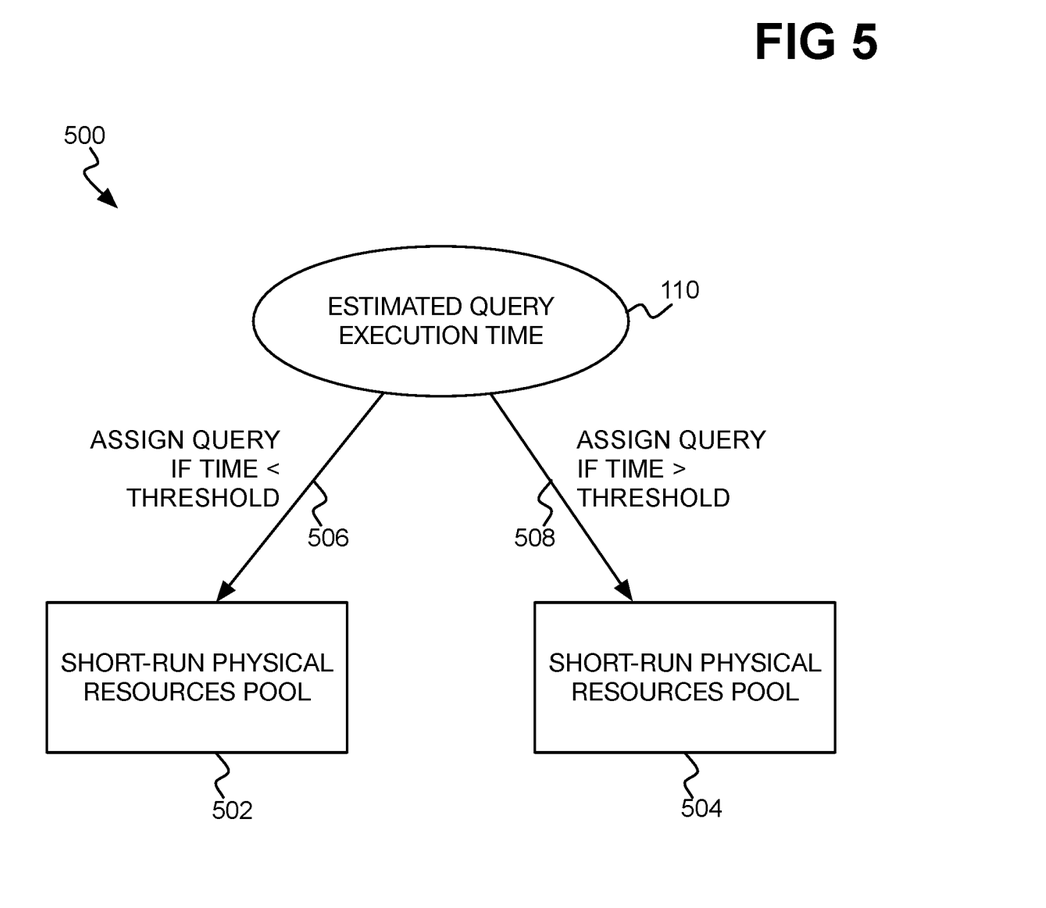
FIG. 5 is a diagram depicting example query execution based on predicted estimated query execution time.

FIG. 5 shows an example 500 of how a query can be executed based on its estimated query execution time 110. Execution of the query more specifically means executing the selected query plan for a query, which itself more specifically means executing the operators of the operation tree of the selected query plan. A DBMS executes the query using physical resources of the computing system on which the DBMS is running. The physical resources can include processing resources, memory resources, storage resources, network resources, and so on.

In the example 500, the physical resources of the computing system that the DBMS can utilize are divided into two pools: a short-run physical resources pool 502 and a long-run physical resources pool 504. The physical resources within the short-run pool 502 are used to execute short-run queries, which are queries having short estimated execution times. By comparison, the physical resources within the long-run pool 504 are used to execute long-run queries, which are queries having long estimated execution times. By particularly reserving resources for short-run queries, query latency of such queries can be maintained satisfactorily low without being bogged down by long-run queries that may over time monopolize the physical resources.

Therefore, in the example 500 of FIG. 5, if the estimated query execution time 110 for a received query is less than a threshold, the query is assigned to the short-run physical resources pool 502 (506), and the resources of the pool 502 used to execute the query. If the estimated query execution time 110 for a received query is greater than the threshold, the query is assigned to the long-run physical resources pool 504 (508), and the resources of the pool 504 used to execute the query. While just two pools are depicted in the example 500, there can be more than two pools, with corresponding thresholds between adjacent pools.

Improving the prediction accuracy of estimated query execution time using the machine-learning model 102 improves DBMS performance in executing queries based on their estimated query execution times. In the example 500 of FIG. 5, an accurately predicted estimated query execution time 110 means that a query will be executed using the physical resources of the pool 502 or 504 appropriate for the query. If an actual long-run query is instead predicted as being a short-run query and assigned to the resources pool 502, for instance, the performance of actual short-run queries being executed by the resources pool 502 may suffer as the incorrectly assigned query uses the resources of the pool 502 for an unexpectedly long period of time. While the query may be transferred to the long-run physical resources pool 504 when it is discovered that the query is in actuality a long-run query, this query transfer itself wastes resources and can degrade DBMS performance.

Figure 6:
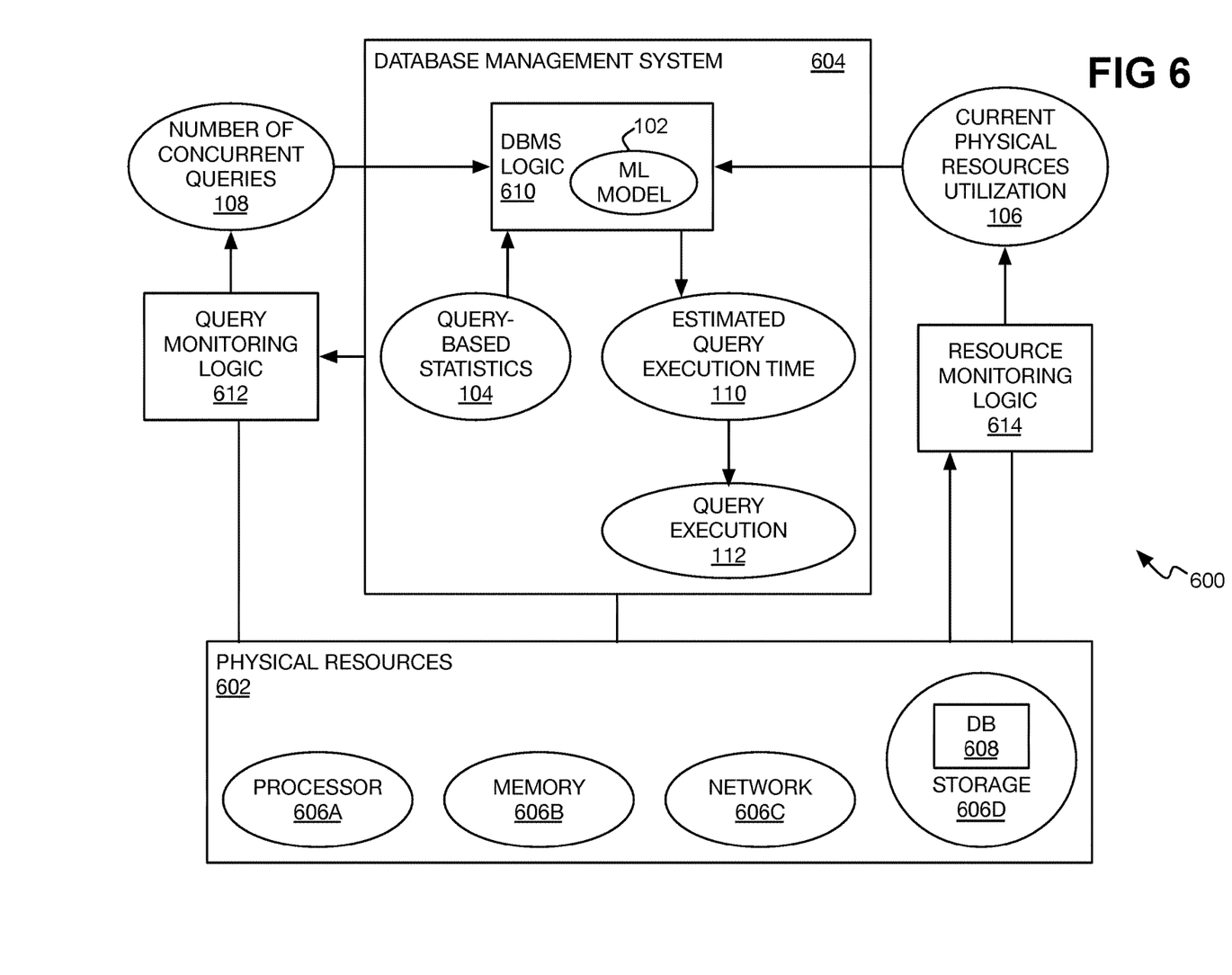
FIG. 6 is a diagram of an example computing system including an example database management system (DBMS).

FIG. 6 shows an example computing system 600. The computing system 600 may be a server computing device, or a number of such devices interconnected locally or over the cloud as a distributed computing system. The computing system 600 may be an MPP computing system. The computing system 600 includes physical resources 602 and a DBMS 604 running on the physical resources 602.

The physical resources 602 of the computing system 600 can include processor resources 606, memory resources 606B, network resources 606C, and storage resources 606D. The processor resources 606 can include central-processing units (CPUs) having multiple processing cores, as well as a GPU. The memory resources 606B can include volatile memory such as dynamic randomly accessible memory (DRAM). The network resources 606C can include network adapters that permit the computing system 600 to connect to a network. The storage resources 606D can include non-volatile storage devices like hard disk drives and solid-state drives, and store a database 608 of the DBMS 604.

The computing system 600 includes DBMS logic 610, query monitoring logic 612, and resource monitoring logic 614. The logic 610, 612, and 614 are said to be implemented by the physical resources in that they run on the physical resources 602 of the computing system 600. For instance, the logic 610, 612, and 614 may each be implemented as program code executed by the processing resources 606A from the memory resources 606B. In the example of FIG. 6, the query monitoring logic 612 is depicted as external to the DBMS 604, but it may be part of the DBMS 604.

The DBMS logic 610 receives query-based statistics 104 regarding a received query. The query-based statistics 104 are generated without taking into account concurrent queries being executed by the DBMS 604. As noted above, the query-based statistics 104 can be generated by a query optimizer of the DBMS 604, and are generated without taking into account the concurrent queries also being executed by the DBMS 604. The query optimizer may be considered part of the DBMS logic 610 in one implementation, such that the logic 610 also generates the query-based statistics 104.

The DBMS logic 610 also receives the number of concurrent queries 108 being executed by the DBMS 604, and the current physical resources utilization 106 of the physical resources 602 of the computing system 600. On the basis of the query-basis statistics 104, the number of concurrent queries 108, and the current physical resources utilization 106, the DBMS logic 610 predicts the estimated execution time 110 for the received query, and the DBMS 604 proceeds with execution 112 of the query based on the predicted estimated query execution time 110, as noted above. (That is, the DBMS logic 610 causes the DBMS 604 to execute the query based on the predicted estimated query execution time 110.) For instance, the DBMS logic 610 predicts the estimated query execution time using the machine-learning model 102, with the query-based statistics 104, the number of concurrent queries 108, and the current physical resources utilization 106 as being input features of an input vector to the model 102.

The query monitoring logic 612 monitors the number of queries 108 that the DBMS 604 is concurrently executing, providing this information to the DBMS logic 610. Likewise, the resource monitoring logic 614 monitors the current physical resources utilization 106 of the physical resources 602 of the computing system 600, providing this information to the DBMS logic 610. The current physical resources utilization 106 of each physical resource 602 may be expressed as a percentage of the resource 602 that is being utilized or that remains available, or may be expressed in another manner. As on example, the current physical resources utilization 106 of the memory resources 606B may be expressed as the amount of memory consumed or remaining, and/or the current memory transfer rate on the bus connecting the memory resources 606B to the processing resources 606A.

Figure 7:
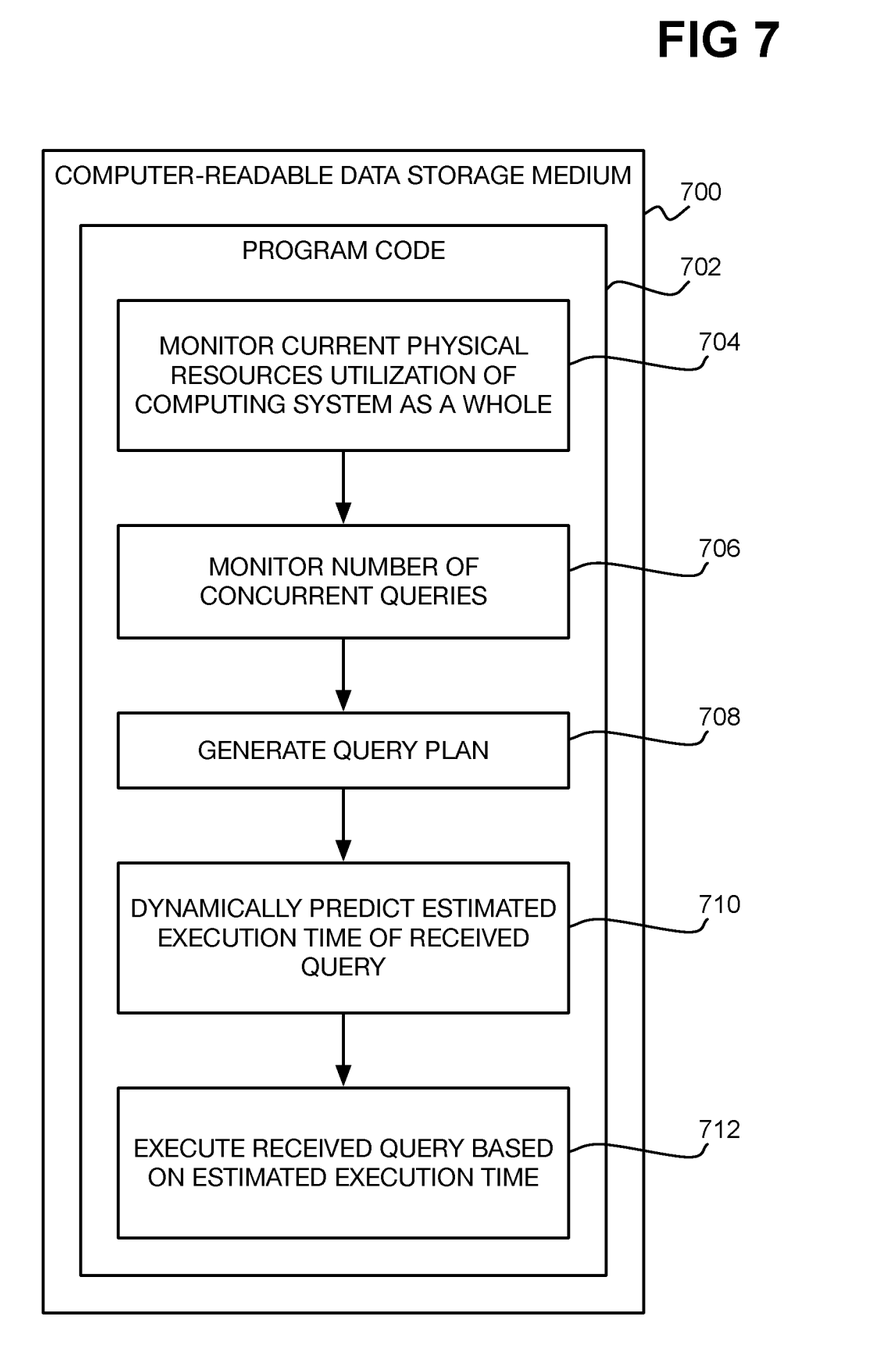
FIG. 7 is a diagram of an example non-transitory computer-readable data storage medium.

FIG. 7 shows an example computer-readable data storage medium 700. The computer-readable medium 700 stores program code 702 that a computing system on which a DBMS is running can execute, such as the computing system 600 on which the DBMS 604 is running. The computing system monitors the current physical resource utilization of the computing system as a whole (702), and also monitors the number of concurrent queries that the DBMS is currently executing (704). For a received query, the computing system generates a query plan to be executed against the database of the DBMS (708). The computing system dynamically predicts the estimated execution time of the received query, using a machine-learning model as has been described (710). The computing system then executes the received query against the database based on the dynamically predicted estimated execution time for the received query (712), as has also been described.

Figure 8:
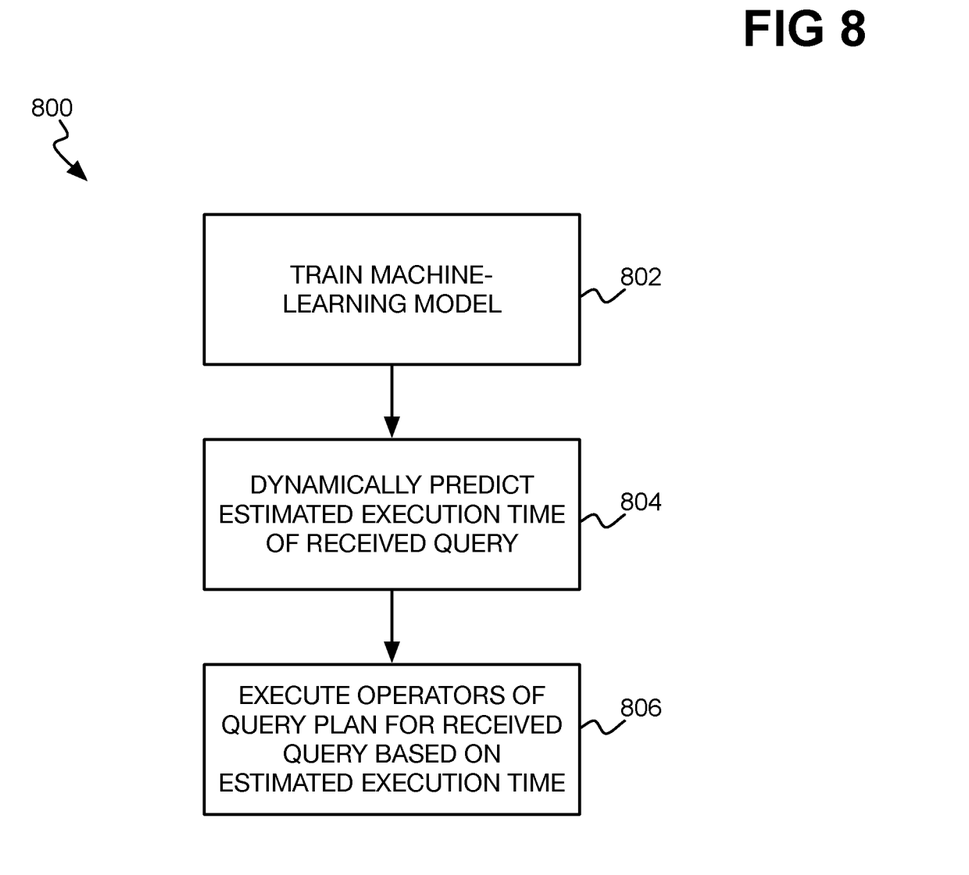
FIG. 8 is a flowchart of an example method.

FIG. 8 shows an example method 800. The method 800 at least in part may be implemented as program code executable by a computing system, like the computing system 600 of FIG. 6. The method 800 includes training a machine-learning model to dynamically predict estimated query execution time from query-based statistics pertaining to the query, a monitored number of concurrent queries, and a monitored physical resources utilization of the computing system. For example, historical data may be maintained regarding this information, and the data used as training data to train the machine-learning model. One part of the training data may specifically be used to train the model, for instance, with another part of the training data used to validate the accuracy of the trained machine-learning model. Once the machine-learning model has been trained, the method 800 can dynamically predicted the estimated execution time of a received query (804), and then execute the operators of a selected query plan for the query based on the estimated execution time (806).

The techniques that have been described therein thus can improve database performance by improving the accuracy of estimated query execution time. The accuracy of the estimated query execution time of a query is improved by taking into account other, concurrently executing queries. A machine-learning model can be employed in this respect, in which there are three types of input features. One type of input features includes query-based statistics that do not take into account the other, concurrently executing queries. The other types of input features supplement the query-based statistics by taking into account the concurrent queries, and include the current physical resources utilization of the computing system on which the DBMS is running, and the number of concurrent queries.

We claim:

1. A non-transitory computer-readable data storage medium storing program code executable by a computing system on which a database management system (DBMS) is running to:

monitor how many queries are concurrently being executed against a database by the DBMS, to maintain a count of the queries concurrently being executed;

monitor current physical resources utilization of the computing system as a whole and not on a per-query basis, such that the current physical resources utilization reflects all activity of the computing system, including the queries concurrently being executed as well as other activity of the computing system;

generate a query plan for a received query to be executed against the database of the DBMS, the query plan comprising a hierarchical tree of a plurality of operators that are executable in a bottom-up manner to execute the received query, wherein during generation of the query plan query-based statistics for the received query are generated for each operator of the plurality of operators of the hierarchical tree of the query plan with respect to the received query in isolation and without consideration of the queries concurrently being executed;

provide an input vector to a machine-learning model, the input vector including each of only three types of input features:

the current physical resources utilization of the computing system as a whole and not on a per-query basis, as a first type of input feature;

the count of the queries concurrently being executed, as a second type of input feature; and the query-based statistics for each operator of the query plan and generated during generation of the query plan, as a third type of input feature;

receive as output from the machine-learning model an estimated execution time of the received query, the machine-learning model using each of the three types of input features included in the input vector provided to the machine-learning model to dynamically predict the estimated execution time; and execute the received query against the database, by executing the operators of the query plan, based on the estimated execution time for the received query.

2. The non-transitory computer-readable data storage medium of claim 1, wherein generation of the query plan for the received query comprises generation of the plurality of operators arranged in the hierarchical tree.

3. The non-transitory computer-readable data storage medium of claim 1, wherein generation of the query plan for the received query further comprises, for each operator, generation of processor utilization, memory utilization, and network utilization to execute the operator, and wherein the query-based statistics for the received query comprises the processor utilization, the memory utilization, and the network utilization of each operator.

4. The non-transitory computer-readable data storage medium of claim 3, wherein generation of the query plan for the received query further comprises, for each operator, a number of input table rows to be input to execute the operator, and an estimated number of output table rows that the operator will output upon execution of the operator, and wherein the query-based statistics for the received query comprises the number of input table rows and the number of output table rows of each operator.

5. The non-transitory computer-readable data storage medium of claim 3, wherein generation of the query plan for the received query further comprises generation of a total resource usage to execute the query, and wherein the query-based statistics for the received query comprises the total resource usage of the query.

6. The non-transitory computer-readable data storage medium of claim 1, wherein generation of the query plan for the received query comprises generation of a plurality of candidate query plans, generation of a total resource usage of each candidate query plan without taking into account the queries concurrently being executed against the database, and selection of the candidate query plan having a lowest total resource usage.

7. The non-transitory computer-readable data storage medium of claim 1, wherein the machine-learning model comprises a random forest regression tree model.

8. The non-transitory computer-readable data storage medium of claim 1, wherein the current physical resources utilization comprises one or multiple of:

a current processor utilization of the computing system as a whole and not on a per-query basis;

a current memory utilization of the computing system as a whole and not on a per-query basis;

a current storage utilization of the computing system as a whole and not on a per-query basis;

a current network utilization of the computing system as a whole and not on a per-query basis.

9. The non-transitory computer-readable data storage medium of claim 1, wherein execution of the received query comprises execution of the query plan.

10. The non-transitory computer-readable data storage medium of claim 9, wherein the query plan comprises the plurality of operators arranged in an operation tree, and wherein execution of the query plan comprises execution of the operators as arranged in the operation tree, over a plurality of pipelines of the DBMS.

11. The non-transitory computer-readable data storage medium of claim 1, wherein execution of the received query based on the dynamic predicted estimated execution time comprises assignment of the received query to a selected resource pool of a plurality of resource pools based on the dynamic predicted estimated execution time, and wherein the received query is executed using computing resources of the selected resource pool to which the received query has been assigned.

12. A computing system comprising:
physical resources, including a storage device storing a database of a database management system (DBMS), a processor, and memory;
query monitoring logic implemented by the physical resources to dynamically monitor how many queries are concurrently being executed by the DBMS against the database, to maintain a count of the queries concurrently being executed;
resource monitoring logic implemented by the physical resources to dynamically monitor current physical resources utilization of the physical resources of the computing system as a whole and not on a per-query basis such that the current physical resources utilization reflects all activity of the computing system, including the queries concurrently being executed as well as other activity of the computing system; and
DBMS logic implemented using the physical resources to:
receive a plurality of query-based statistics for each operator of a plurality of operators of a query plan fora received query to be executed against the database, the query plan comprising a hierarchical tree of the plurality of operators that are executable in a bottom-up manner to execute the received query, wherein during generation of the query plan the query-based statistics for the received query are generated for each operator of the plurality of operators of the hierarchical tree of the query plan with respect to the received query in isolation and without taking into account the queries concurrently being executed;
provide an input vector to a machine-learning model, the input vector including each of only three types of input features;
the current physical resources utilization of the computing system as a whole and not on a per-query basis, as a first type of input feature;
the count of the queries concurrently being executed, as a second type of input feature; and
the query-based statistics for each operator of the query plan and generated during generation of the query plan, as a third type of input feature;
receive as output from the machine-learning model an estimated execution time of the received query, the machine-learning model using each of the three types of input features included in the input vector provided to the machine-learning model to dynamically predict the estimated execution time; and
cause the DBMS to execute the received query against the database, by executing the operators of the query plane based on the estimated execution time for the received query.

13. The computing system of claim 12, wherein the query-based statistics are generated as part of generation of the query plan for the received query.

14. The computing system of claim 12, wherein the query-based statistics are generated as part of selection of the query plan for the received query from a plurality of candidate query plans for the received query plan, the query plan selected as the candidate query plan having a lowest total resource usage determined without accounting for the concurrent queries being executed.

15. The computing system of claim 12, wherein the query-based statistics for each operator comprise utilization of the physical resources to execute the operator for each of a plurality of different physical resource types.

16. The computing system of claim 15, wherein the query-based statistics for each operator further comprise:
a total resource usage to execute the operator, the total resource usage determined without accounting for the concurrent queries being executed; and
input and output table rows pertaining to the operator.

17. The computing system of claim 12, wherein the query plan is executed based on the predicted estimated execution time for the received query by executing the query plan using a resource pool of the physical resources selected based on the predicted estimated execution time.

18. The computing system of claim 12, wherein the machine-learning model comprises a random forest regression tree model.

19. A method comprising:
monitoring how many queries are concurrently being executed against a database by a database management system (DBMS) running on a computing system, to maintain a count of the queries concurrently being executed;
monitoring current physical resources utilization of the computing system as a whole and not on a per-query basis, such that the current physical resources utilization reflects all activity of the computing system, including the queries concurrently being executed as well as other activity of the computing system;
generating a query plan for a received query to be executed against the database of the DBMS, the query plan comprising a hierarchical tree of a plurality of operators that are executable in a bottom-up manner to execute the received query, wherein during generation of the query plan query-based statistics for the received query are generated for each operator of the plurality of operators of the hierarchical tree of the query plan with respect to the received query in isolation and without consideration of the queries concurrently being executed against the database;
providing an input vector to a machine-learning model, the input vector including each of only three types of input features:
the current physical resources utilization of the computing system as a whole and not on a per-query basis, as a first type of input feature;
the count of the queries concurrently being executed, as a second type of input feature; and
the query-based statistics for each operator of the query plan and generated during generation of the query plan, as a third type of input feature;
receiving as output from the machine-learning model an estimated execution time of the received query, the machine-learning model using each of the three types of input features included in the input vector provided to the machine-learning model to dynamically predict the estimated execution time; and
executing the received query against the database, by executing the operators of the query plan, based on the estimated execution time for the received query.

20. The method of claim 19, wherein the machine-learning model comprises a random forest regression tree model.

* * * * *